(12) United States Patent
Cowart

(10) Patent No.: US 11,770,494 B1
(45) Date of Patent: Sep. 26, 2023

(54) APPARATUS, SYSTEMS, AND METHODS FOR PROVIDING A LIGHTOGRAPH

(71) Applicant: Jeremy Cowart Photography, Inc., Franklin, TN (US)

(72) Inventor: Jeremy Cowart, Nashville, TN (US)

(73) Assignee: Jeremy Cowart Photography, Inc., Franklin, TN (US)

( * ) Notice: Subject to any disclaimer, the term of this patent is extended or adjusted under 35 U.S.C. 154(b) by 0 days.

(21) Appl. No.: 17/840,025

(22) Filed: Jun. 14, 2022

Related U.S. Application Data

(60) Provisional application No. 63/210,297, filed on Jun. 14, 2021.

(51) Int. Cl.
| | |
|---|---|
| *H04N 5/262* | (2006.01) |
| *H04N 23/62* | (2023.01) |
| *H04N 23/667* | (2023.01) |

(52) U.S. Cl.
CPC ........... *H04N 5/2625* (2013.01); *H04N 23/62* (2023.01); *H04N 23/667* (2023.01)

(58) Field of Classification Search
None
See application file for complete search history.

(56) References Cited

U.S. PATENT DOCUMENTS

| | | | |
|---|---|---|---|
| 7,231,060 B2* | 6/2007 | Dowling | H04S 5/005 700/86 |
| 2015/0077591 A1* | 3/2015 | Fujiwara | H04N 23/62 348/234 |
| 2015/0215623 A1* | 7/2015 | Sanders | H04N 23/71 375/240.08 |
| 2017/0251538 A1* | 8/2017 | Green | G06T 7/74 |
| 2020/0105003 A1* | 4/2020 | Stauber | G06T 11/001 |
| 2022/0044478 A1* | 2/2022 | Tashiro | H04N 23/951 |
| 2023/0076326 A1* | 3/2023 | Xu | G06T 15/06 |

* cited by examiner

*Primary Examiner* — Cynthia Segura
(74) *Attorney, Agent, or Firm* — Patterson Intellectual Property Law; Gary L. Montle

(57) ABSTRACT

A system and method are provided for creating a moving light image for visualizing light transition across a subject (e.g., a lightograph), and include an image capture apparatus, various light effect elements (e.g., including strobes) arranged at different locations around a subject, and a processor. The processor, upon receiving a trigger command, directs the image capture apparatus to capture images in rapid succession, i.e., sufficiently rapid that the subject is substantially static for a duration of a specified sequence of images. Each of the images may have a different respective lighting configuration via selective implementation of at least one of the various light effect elements. The processor automatically generates and stores an executable file associated with the captured plurality of images, wherein execution of the file causes retrieval and time-based reproduction of one or more of the images and corresponding lighting effects in a substantially static image reference frame.

20 Claims, 4 Drawing Sheets

APPARATUS, SYSTEMS, AND METHODS FOR PROVIDING A LIGHTOGRAPH

CROSS-REFERENCES TO RELATED APPLICATIONS

This application claims benefit of U.S. Provisional Patent Application No. 63/210,297 as filed Jun. 14, 2021, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

Various embodiments of an invention as disclosed herein may relate generally to the generation of photographs and images of a subject having associated lighting effects. More particularly, an invention as disclosed herein may address a lack of conventional systems and methods for giving life to photographs and images through such lighting effects.

Otherwise stated, existing systems are incapable of capturing a plurality of images having different lighting configurations in rapid succession while avoiding any movement or adjustment to a subject. It would accordingly be desirable to provide a system enabling photographers to create, or otherwise automating the creation of, moving light images capable of visualizing light transition across a subject to provide the ability for an image to convey information such as a mood or a story not capable of performance in existing technologies.

BRIEF SUMMARY

In a particular embodiment, a computer-implemented method is disclosed herein of creating a moving light image (e.g., a lightograph) for visualizing light transition across a subject. The method may include capturing a plurality of images in rapid succession and in a specified sequence, each of the plurality of images having a different respective lighting configuration via a plurality of lighting sources arranged with respect to the subject, wherein the subject is substantially static for a duration of the specified sequence. The method may further include automatically generating and storing an executable file associated with the captured plurality of images, wherein execution of the file causes retrieval and time-based reproduction of one or more of the plurality of images and corresponding lighting effects in a substantially static image reference frame.

In one exemplary aspect according to the above-referenced embodiment, one or more of the captured plurality of images may be selectively retrieved and displayed in accordance with one or more parameters associated with execution of the file.

In another exemplary aspect according to the above-referenced embodiment, the respective lighting configuration for each of the plurality of images may be predetermined according to a user selection via a user interface.

In another exemplary aspect according to the above-referenced embodiment, the method may further include enabling user selection via the user interface of an operating mode from among a plurality of selectable operating modes, wherein the respective lighting configuration for each of the plurality of images is predetermined according to the selected operating mode.

In another exemplary aspect according to the above-referenced embodiment, the method may further include verifying that a capture apparatus associated with a requested image capture is stabilized with a field of view including the subject.

In another exemplary aspect according to the above-referenced embodiment, the step of generating the executable file may include stitching a subset of the captured plurality of images and associated lighting effects according to one or more user-selectable mood parameters.

For example, the executable file may be generated as an animated display with respect to a user-specified time lapse as one of the one or more user-selectable mood parameters.

In another exemplary aspect according to the above-referenced embodiment, the method may further include aligning the plurality of captured images into respective layers of a working file having a first file format, said alignment with respect to identifiable edges at each layer and for each respective image, enabling image adjustment in the first file format, and selectively exporting one or more of the plurality of captured images into an executable file having a second file format with a higher image resolution.

In another embodiment, a system is disclosed herein for creating a moving light image for visualizing light transition across a subject. The system in this embodiment includes an image capture apparatus (e.g., a camera), a plurality of light effect elements (e.g., strobes) arranged at different locations around a subject, and a processor. The processor may be configured to direct the performance of steps according to the above-referenced method embodiment and any one or more of the optional aspects associated therewith.

In an exemplary aspect according the above-referenced system embodiment, the processor and the image capture apparatus are commonly associated with an electronic device having a display unit, and the electronic device is functionally linked to a communications network.

In an exemplary aspect according the above-referenced system embodiment, the processor is associated with an electronic device having a display unit, and the electronic device is functionally linked to at least the image capture apparatus via a communications network.

As referenced herein, the term "lightograph" may be used to define or otherwise include a photograph containing evolving light that may be shared as a file including an animated image or video. A subject may be a person in a portrait environment, though the process can have many other applications as well outside of portraits. The process is unique in accordance with aspects of the technical nature of the capture, the shift of the light, and the output in a still photo in a lighting animation that appears to have an evolving feeling.

The unique effect of a lightograph may be produced by taking two or more photographs in rapid succession. Each click of a camera shutter may capture a different light or lights hitting the subject or scene. The scene may be viewed as remaining the same because of the rapid shutter capture. The still images may then be combined together to tell multiple visual stories using a single photograph. This unique method changes the way that portraits may be used across digital platforms. The method may include displaying the progression of light throughout the frame as an in-camera optical capture in various embodiments.

In accordance with aspects of the present disclosure, a skilled photographer can create a lightograph with light that shifts for a specific mood or story. The photographer may select the specific lighting order and creative direction of the light. A rapid progression of images may be captured on a timing interval required for lightographs. Finishing up the process, the still images may be blended into one unique successive lightograph file. The individual photos can also be combined to form a "lightogif," which as used herein may refer for example to an animated gif of the lightograph sequence.

According to further aspects of the present disclosure, provided is a timing process of the lightograph for lighting and lighting transmitters and receivers. This technical process applies to hardware and software driven devices. The lightograph process can also be licensed for automatic assembly of the lightograph for various software capture programs.

Implementations consistent with the present disclosure may provide a lightograph which differs from existing technologies such as motion pictures and animated files such as gif files. For example, lightographs may differ from motion-picture because there is no frame motion. Thus, a lightograph is not structurally equivalent to a photograph because the lighting evolves over time using the lighting and/or blending processes described herein. Furthermore, lightographs may differ from animated files such as gif files in that output is not merely a series of separate pictures but a series of blended identical subject pictures, for example where the only thing changing is the light in various embodiments. Thus, the blending and the creation/automation thereof distinguish over traditional animated image files. In accordance with aspects of the present disclosure, the viewer of a lightograph may "feel" the mood change on the image.

Whereas in some aspects according to the present disclosure a lightograph may be fixed in an exported file, in other aspects within the scope of the present disclosure a lightograph may be loaded into or otherwise implemented within a custom application to be selectively executed or otherwise played, substantially in real time according to user interaction with an interface tool associated with the app. For example, an input device such as a mouse may be used to actively or passively interface with a thumbnail image or other link associated with the lightograph, wherein the blended images and associated lighting effects may be played in real time, sped up, slowed down, paused, or the like based for example on various predetermined or user-selectable parameters.

Numerous other objects, features, and advantages of the present disclosure will be readily apparent to those skilled in the art upon a reading of the following disclosure when taken in conjunction with the accompanying drawings.

DETAILED DESCRIPTION

Figure 1:
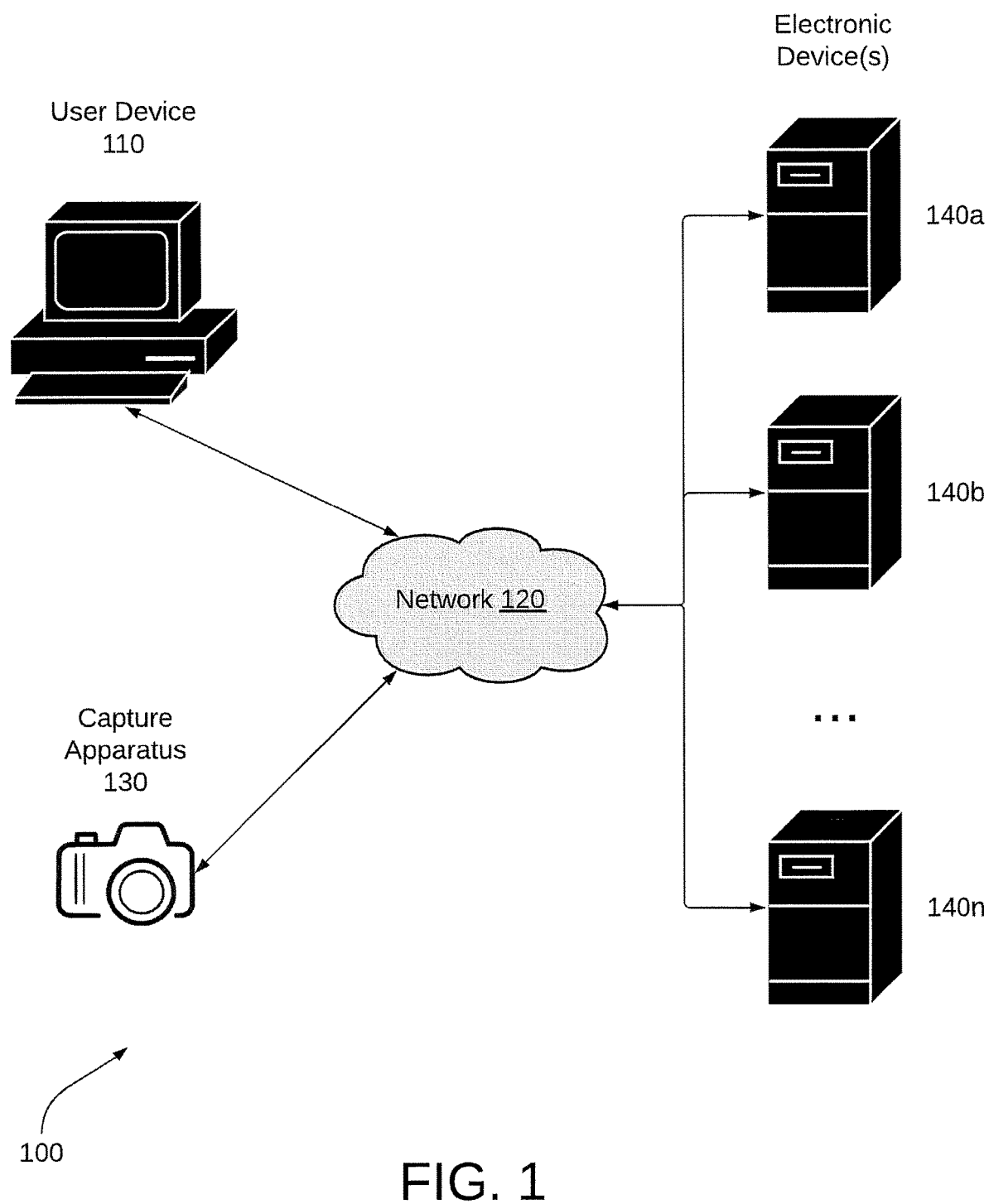
FIG. 1 illustrates an exemplary embodiment of a partial block network diagram according to aspects of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the implementations consistent with the present disclosure and do not delimit the scope of the present disclosure.

Referring generally to FIGS. 1-4, various exemplary apparatuses, systems, and associated methods according to the present disclosure are described in detail.

Where the various figures may describe embodiments sharing various common elements and features with other embodiments, similar elements and features are given the same reference numerals and redundant description thereof may be omitted below.

Various embodiments of an apparatus according to the present disclosure may provide apparatuses, systems, and methods for providing a lightograph.

FIG. 1 illustrates an exemplary embodiment of a partial block network diagram according to aspects of the present disclosure. The system 100 is a simplified partial network block diagram reflecting a functional computing configuration implementable according to aspects of the present disclosure. The system 100 includes a user device 110 coupleable to a network 120, a capture apparatus 130 coupleable to the network 120, and one or more electronic devices 140*a*, 140*b*, . . . , 140*n* coupleable to the network 120. The capture apparatus 130 may be a standalone device or in combination with at least one other external component either local or remotely communicatively coupleable with the capture apparatus 130 (e.g., via the network 120). The capture apparatus 130 may be a camera in various embodiments, for example a Digital Single-Lens Reflex (DSLR) camera. The capture apparatus 130 may be and/or include at least one light effect element, such as a strobe or other hardware or software element useable to perform at least one operation or to assist in performing at least one operation described herein. Additionally or alternatively, there may be a plurality of capture apparatuses 130 useable together to form a lightograph as described herein, without departing from the spirit and scope of the present disclosure.

At least one of the user device 110, the capture apparatus 130, and/or the electronic devices 140*a*, 140*b*, . . . , 140*n* may be configured to store, access, or provide at least a portion of information usable to permit one or more operations described herein. For example, at least one portal, webpage, interface, and/or downloadable application may be provided by or to a user device 110 to enable one or more operations described herein. One or more of the electronic devices 140*a*, 140*b*, . . . , 140*n* may additionally or alternatively be configured to store content data and/or metadata to enable one or more operations described herein. One or more of the electronic devices 140*a*, 140*b*, . . . , 140*n* may include a device such as a strobe or other lighting element useable in conjunction with the capture apparatus 130 to perform or assist in performing at least one operation described herein. One or more of the electronic devices 140*a*, 140*b*, . . . , 140*n* may be coupleable to the capture apparats 130 and/or to the user device 110 via wired and/or wireless connection in various embodiments, for example via the network 120. The one or more of the electronic devices 140*a*, 140*b*, . . . , 140*n* may include a public or private Application Programming Interface (API) accessible via the network 120 and useable to perform or to assist in performing one or more operation described herein.

In one exemplary embodiment, the network 120 includes the Internet, a public network, a private network, or any other communications medium capable of conveying electronic communications. Connection between elements or components of FIG. 1 may be configured to be performed by wired interface, wireless interface, or combination thereof, without departing from the spirit and the scope of the present disclosure. At least one of the user device 110, the capture apparatus 130, and/or the electronic device(s) 140*a*, 140*b*, . . . , 140*n* may include a communication unit configured to permit communications for example via the network 120. Communications between a communication unit and any other component may be encrypted in various embodiments.

In one exemplary operation, at least one of the user device 110, the capture apparatus 130, and/or the electronic device(s) 140*a*, 140*b*, . . . , 140*n* is configured to store one or more sets of instructions in a volatile and/or non-volatile storage. The one or more sets of instructions may be configured to be executed by a microprocessor of the user device 110, the capture apparatus 130, and/or the electronic device(s) 140*a*, 140*b*, . . . , 140*n* to perform operations corresponding to the one or more sets of instructions.

In various exemplary embodiments, at least one of the user device 110, the capture apparatus 130, and/or the electronic device(s) 140*a*, 140*b*, . . . , 140*n* is implemented as at least one of a desktop computer, a server computer, a laptop computer, a smart phone, or any other electronic device capable of executing instructions. A microprocessor of the user device 110, the capture apparatus 130, and/or the electronic device(s) 140*a*, 140*b*, . . . , 140*n* may be a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a specific operation or result. Although described as a microprocessor, it should be appreciated that the microprocessor may be any type of hardware and/or software processor or component and is not strictly limited to a microprocessor or to any operation(s) only capable of execution by a microprocessor.

One or more computing component and/or functional element may be configured to operate remotely and may be further configured to obtain or otherwise operate upon one or more instructions stored physically remote from one or more user device 110, capture apparatus 130, electronic device(s) 140*a*, 140*b*, . . . , 140*n*, and/or functional element (e.g., via client-server communications or cloud-based computing).

At least one of the user device 110, the capture apparatus 130, and/or the electronic device(s) 140*a*, 140*b*, . . . , 140*n* may include a display unit. The display unit may be embodied within the computing component or functional element in one embodiment and may be configured to be either wired to or wirelessly interfaced with at least one other computing component or functional element. The display unit may be configured to operate, at least in part, based upon one or more operations of the described herein, as executed by the microprocessor.

The one or more electronic devices 140*a*, 140*b*, . . . , 140*n* may be one or more devices configured to store data, operate upon data, and/or perform at least one action described herein. One or more electronic devices 140*a*, 140*b*, . . . , 140*n* may be configured in a distributed manner, such as a distributed computing system, cloud computing system, or the like. At least one electronic device 140 may be configured to perform one or more operations associated with or in conjunction with at least one element described herein. Additionally or alternatively, one or more electronic device 140 may be structurally and/or functionally equivalent to the user device 110 or the capture apparatus 130.

Figure 2:
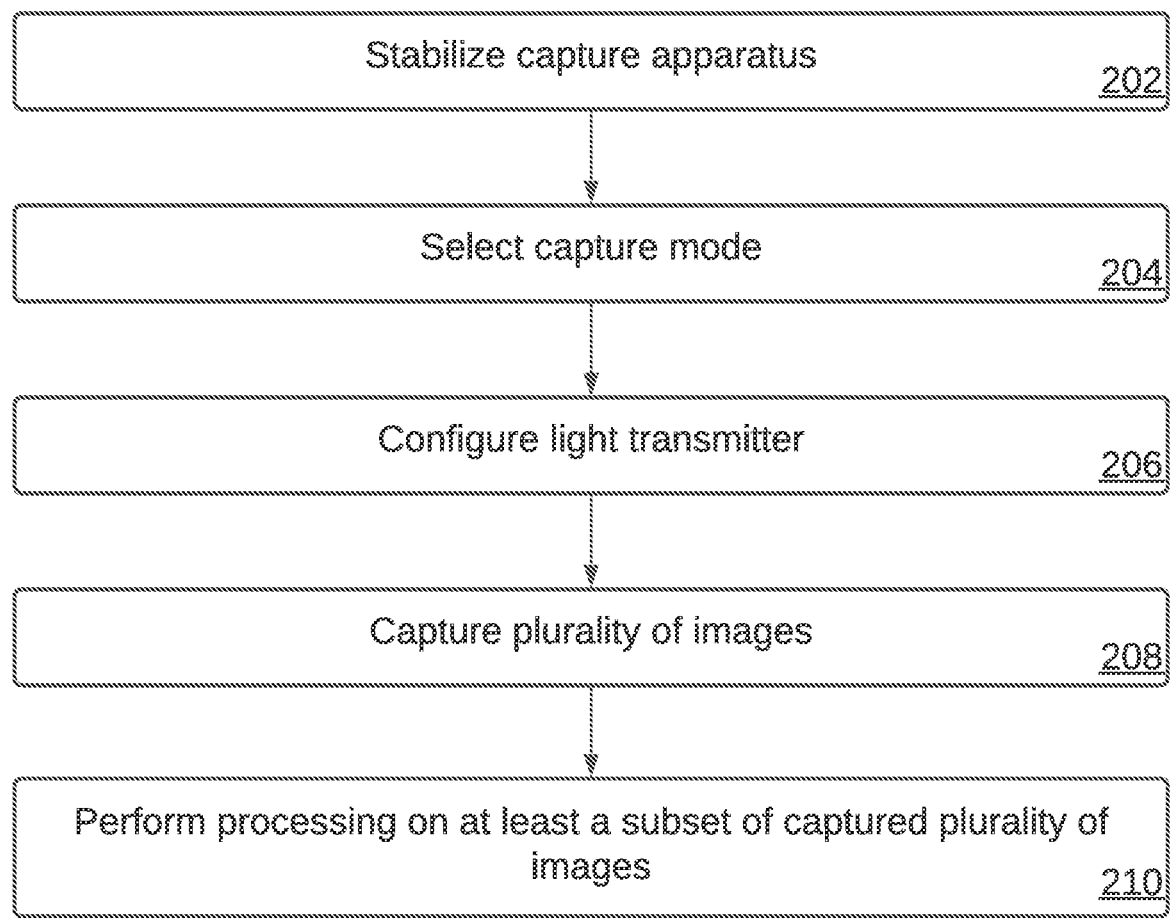
FIG. 2 illustrates an exemplary embodiment of a process for capturing a lightograph according to aspects of the present disclosure.

FIG. 2 illustrates an exemplary embodiment of a process for capturing a lightograph according to aspects of the present disclosure. The process 200 begins at an operation 202 where the capture apparatus 130 is stabilized. This may include, for example, placing the capture apparatus 130 on a tripod or otherwise ensuring that the capture apparatus 130 remains still. This stabilization may be performed to avoid movement which might ruin the effect of the final lightograph product. The capture apparatus 130 may include the capability to shoot a very high-speed burst mode. For example, a capture apparatus 130 capable of a high-speed burst mode of twelve frames per second or faster may be ideal for certain lightographs. A wired or wireless remote may be coupleable to the capture apparatus 130 so that the photographer's hand does not touch the capture apparatus 130 and risk movement of the capture apparatus 130 and corresponding misalignment the end result files. In various exemplary embodiments, a capture apparatus 130 may be selected which has a shutter speed of greater than 50 frames per second.

A capture mode may be selected at an operation 204. The capture mode may be selected, for example, from one or more burst modes. In an exemplary embodiment, the selected capture mode at operation 204 may be a high-speed burst mode configured to obtain a plurality of images while the subject of the image remains still. A light transmitter may be configured at an operation 206. Configuring the light transmitter at operation 206 may include attaching a light transmitter to the capture apparatus 130 and setting the light transmitter to select an order of one or more lighting strobes and their attached receivers. A check may be performed to ensure that at least two lights or lighting groups are selected to cycle through.

A plurality of images may be obtained via the capture apparatus 130 at an operation 208. This may include capturing at least a portion of the plurality of images according to the selected capture mode (e.g., high-speed burst mode). At least one of a user and/or computing device may determine whether different lights have fired for each frame in a desired manner. Once the plurality of images have been obtained, at least a portion of the plurality of images may be selected and stitched together to create a lightograph. One or more software tools may be used to stitch together the at least portion of the plurality of images, for example Adobe Premiere, iMovie, Adobe After Effects, etc.

Figure 3:
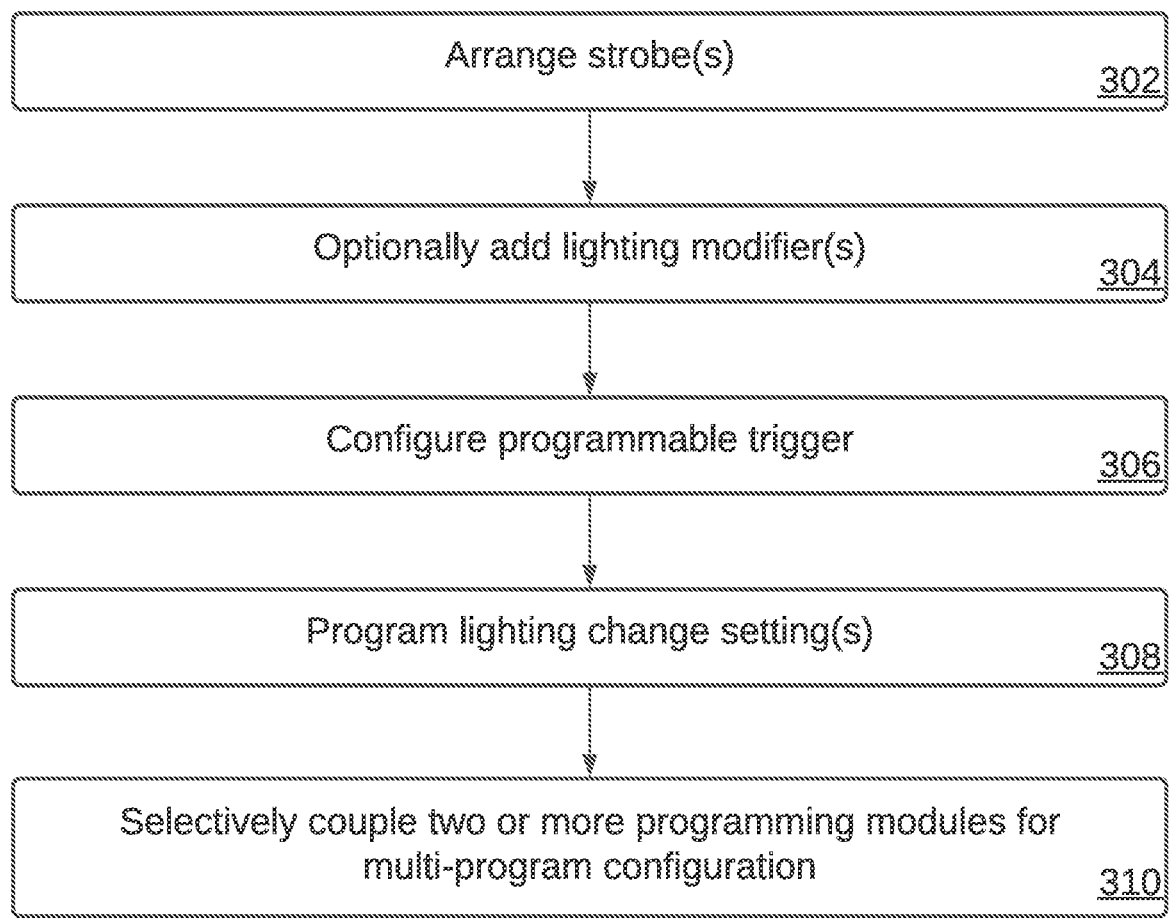
FIG. 3 illustrates an exemplary embodiment of a process for configuring lighting for a lightograph according to aspects of the present disclosure.

FIG. 3 illustrates an exemplary embodiment of a process for configuring lighting for a lightograph according to aspects of the present disclosure. The process 300 begins at an operation 302 where strobes are arranged. Two or more strobes may be set up in different locations around a subject. The strobe(s) may be checked to ensure that they can recycle power at the speed of a capture apparatus 130's frames per second setting. One or more lighting modifiers is optionally added at an operation 304. This is an optional step, as no lighting modifiers are required for system operation. A programmable trigger is configured at an operation 306. The programmable trigger may be a programmable hardware trigger (such as ProFoto PocketWizards or other programmable trigger(s)) configured to be set to each of the strobes.

In various embodiments, programming may be performed manually, for example using a PocketWizard remote. An example of a manual configuration may include setting each PocketWizard to channel 17, setting each PocketWizard to receiver mode, and assigning each PocketWizard to a single group (e.g., ABCD). One or more lighting changes may be programmed at an operation 308 (for example, four lighting changes, although any number may be used without departing from the spirit and scope of the present disclosure). In various exemplary embodiments, at least two lighting changes may be used, although in carious embodiments between four to eight lighting changes may be used (or more, if desired). For more than four programs, a plurality of programming modules may be coupled to one another at an operation 310, for example in a daisy chain configuration.

By following the process illustrated and described with reference to FIG. 2, each one of the strobes may be configured to fire one at a time in rapid succession. Each light may be configured to hit the subject differently, thereby creating a series of images showing each one of the different lightings. This process may be used to highlight dramatically different mood feels per shot. Using this technology, a photographer may be capable of curating a story with lighting for the different setups. As a result, a photograph or portrait implemented as a lightograph can tell more than one story for the first time in history. Lighting can change the perception of mood, age, tone, and/or nuance. Furthermore, because the lighting evolves through a lightograph, the lightograph functions as a new medium all together.

As noted above, the subject of a lightograph may remain completely still or as close to completely still as possible during the "lightomation" to provide optimal effect. Any movement, even a hair moving, might tarnish the effect of the final lightograph. Thus, providing rapid fire burst shots with specifically timed lighting sequences according to a frames per second setting of a capture apparatus 130 may help to eliminate movement and changes between images where each lighting configuration is modified manually between shots, or even where an automated lighting change is slow.

Figure 4:
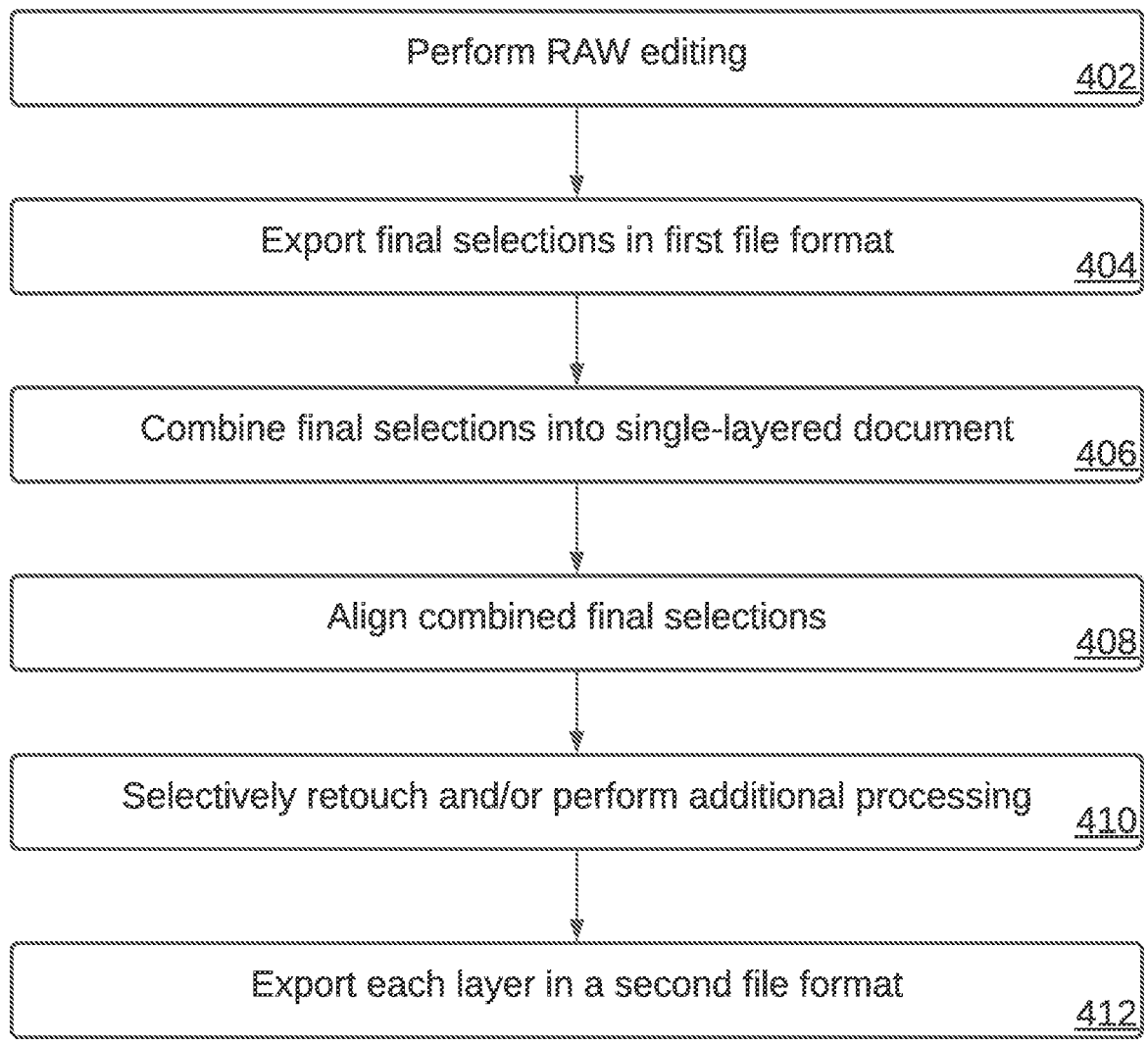
FIG. 4 illustrates an exemplary embodiment of a process for editing a set of images used to create a lightograph according to aspects of the present disclosure.

FIG. 4 illustrates an exemplary embodiment of a partial process for editing a set of images used to create a lightograph according to aspects of the present disclosure. The process 400 begins at an operation 402 where RAW editing may be performed on at least one image captured by the capture apparatus 130. RAW editing features may include, but is not limited to, editing an overall color, adjusting contrast, cropping at least a portion of the image, and/or any other image editing operation, either alone or in combination. Although described with reference to RAW editing, it should be appreciated that one or more data formats other than RAW may be used for editing at operation 402 without departing from the spirt and scope of the present disclosure. One or more editing features may be implemented, for example, using editing software such as Adobe Lightroom, Capture One Pro, or any other editing software or portal. Final selects of images may be exported in a first file format via at least one image editing software or portal at an operation 404. The first file format may include a JPG or TIF format in various embodiments, although other file formats may be used without departing from the spirit and scope of the present disclosure.

Final select images may be opened and combined into a one-layered document at an operation 406. The combined final selections may be aligned at an operation 408, for example by zooming in and dragging rulers to identifiable edges to ensure that each layer aligns. Selective retouching and/or additional image processing may be performed at an operation 410. This may include skin or photo retouching, while ensuring to retouch each layer the same such that it is seamless in the final lightograph. Each layer may then be exported in a second file format at an operation 412. The second file format may be a high-resolution format such as JPG in various embodiments, although other formats may be used.

After completing editing, the images may be combined to form a lightograph. Image combination may be performed, for example, by placing each of the edited images into a movie editing software. The video can be anything over two seconds long. Each image may be blended and flatted together to create a desired effect. This can be done many different ways. One such way imports the images into editing software such as Adobe After Effects and adjusts the opacity of the images to create a blending effect. In an exemplary embodiment, the finished blend run may be between 1.3 to 3 seconds for the blend change. In various exemplary embodiments, a blending interval of between 1.3 to 2.4 only composite (additive mix) blend may be used. Creatively the lighting, background, and/or foreground light can all change, but subject does not.

Final Product: At the end of the process, the creator will have a series of two or more high resolution images (lightos) that have captured completely different lighting. They will also have one lightograph animation that shows the progression of light across a still image. The final lightograph may be configured to give or otherwise convey the feel and illusion that the viewer is watching a time lapse of light. The creator also has the option to export a "lightogif," which may be an animated gif sequence of a plurality of lightos. The creator has the further option to create a "lightollage" file in post, which is the creative assembly of lightos in post.

According to aspects of the present disclosure, to produce a lightograph a user may use a DSLR camera that can shoot on high-speed burst mode. A goal may be to make sure that no movement is captured in images captured by the DSLR camera. The camera may be set on a tripod to eliminate any movement. A PocketWizard Multimax may be attached to the camera and set to a SpeedCycler setting, which allows a photographer to cycle through groups of lights quickly. The Multimax may be set to channel 17 and to transmitter mode in various embodiments.

The next step may be to set up lighting. Two or more strobes in different locations may be placed around a subject. A photographer may make sure that the strobes can recycle quickly. Any optional lighting modifiers may be added to create a desired effect. Each strobe may be plugged into a PocketWizard unit, for example having been set to channel 17 and to receiver mode. Lastly, each PocketWizard may be assigned to its own lighting group. At least two groups may be used, up to 32 different lighting groups are possible.

By following the steps above, implementations consistent with the present disclosure may allow each one of the strobes to fire one at a time in rapid succession. Each light may be configured to hit the subject differently, thereby creating a series of images showing each one of the different lighting. For this process to work it may be helpful to ensure that a subject remains completely still while images are captured by the capture apparatus 130, as any movement, even a hair, might ruin the effect of the final product.

After finished shooting, a photographer may edit one or more images in an editing software such as Lightroom, Capture One Pro, or other editing software or portal. Once editing is complete, the edited images may be exported in a first format, such as JPG. The images may be properly aligned, for example by opening the images in Adobe Photoshop. A new PSD file may be created, and each image paced on its own layer. Each image may be checked to ensure that it is aligned and may be adjusted accordingly.

The images may be placed into a movie editing software. A video created in this manner may be anything over two seconds long. Each image may be blended and flatted together to create a desired effect. This can be done many different ways, such as importing the images into Adobe After Effects and adjusting the opacity of the images to create a blending effect. At the end of the process there may be a series of two or more high resolution images that have captured completely different lighting. There may also be a video that shows the progression of light across a still image. The final video may be configured to give the illusion that the viewer is watching a time lapse of light. A final lightograph may be provided in a number of formats, such as a video file, an image file, an animated image file, or any other visual format capable of reflecting the lighting transition between images as described herein.

Equipment and software useable with implementations consistent with the present disclosure include, but are not limited to, a DSLR camera capable of connecting to a lighting control transmitter, at least two lighting strobes, at least two lighting receivers, studio lighting equipment such as light stands, sandbags, etc., one or more lighting modifiers (such as soft boxes, grids, snoots, beauty dishes, etc.), a tripod, photo editing software such as Adobe Photoshop, Adobe Lightroom, Capture One Pro, or the like, and/or video editing software or app (such as Black Magic Davinci, Adobe Premiere, Adobe After Effects, Apple Final Cut, iMovie, etc.).

In addition to the advantages described, lightography provides numerous additional benefits and use cases. For example, the individual "lightos" (photos) can be exported as a "lightogif" (animated gif), which can then be used as gif files across the internet and social media. The process of creating a lightograph may enable completely and forever changing the future of what is possible in post-production. Through the use of an embodiment of a system as disclosed herein, and in contrast with existing systems and corresponding tools, a user may now be able digitally draw or paint in light from other "lightos" in a sequence. For example, because the subject or scene is perfectly still, the user can take the first lighto from the "lightimation" sequence and then paste the second lighto on top of the first (e.g., in Adobe Photoshop). The user may then erase or mask various portions of the second lighto to create new lighting effects that were not previously possible. No computer software can successfully create lighting data that did not exist. Only real light can properly capture a scene in camera. This effect can also be explored with many more layers from the "lightimation" sequence.

Embodiments of a system and method as disclosed herein may enable third party implementations previously unavailable thereto, for example including implementations by software companies like Adobe Photoshop, Adobe Lightroom, Adobe Bridge, Photo Mechanic, Capture One Pro and more to create new "Export Lightograph" or "Create Lightograph" features in their software by implementing aspects of the present disclosure into their software so as to permit quickly exporting lightographs without having to enter motion editing software. Hardware companies such as for example ProFoto or PocketWizard may similarly be able to add new "Lightograph" features to their devices to make lightographs easier to make. These providers may further be able to add lightograph features to their phone apps.

App companies or social networks may also be permitted to implement features to mimic or replicate the lightograph look according to aspects of the present disclosure.

Although generally previously described with reference to two lighting setups, many more lighting setups can be used than just two. Currently up to thirty-six lights or lighting groups are capable of use in a lightimation, although theoretically any number may be used without departing from the spirit and scope of the present disclosure.

Lightographs may be used to change the fashion modeling landscape because models could now be seen in the context of a lightograph. Potential clients could a particular model based on how the light wraps around their face and/or body in the talent scouts. The same applies for all casting needs in any industry.

Magazines may be able to use lightographs inside their digital issues or as their digital magazine covers. The same applies to all publishing companies for digital releases. A magazine may allow a viewer/user to "control" the lighting in a lightograph. For example, a user may be permitted to drag a slider on an iPad or other electronic device and as the user drags the slider, the lightograph video file may sliding back and forth, thus changing the lighting in the photo. No technology currently in existence permits such capabilities. Hollywood may use the same idea to allow users or viewers to change the scene for a movie poster cover.

Being that this is a new form of media altogether, the potential usage is endless across the internet and all devices. Just like the photograph, animated gif, video, cinemegraph, etc., the potential for lightographs has no bounds.

A non-exhaustive list of fields and industries where lightographs may be used in new and useful ways includes (but is not limited to) family portraits (e.g., if the youngest can sit still for one second), bridal portraits, engagement photos, advertising, sports, athletes, senior portraits, baby photography (e.g., while sleeping), macro, pets (when still), lifestyle (e.g., at home), headshots, fashion, wedding photography, product photography, black and white photography, fine art, nudes, boudoir, and/or abstract photography. Further examples of use of lightographs include applying the lightograph process to three-dimensional (3D) models and/or animation. The same applies to uses for applying a lightograph process to old images to bring life back to the images using light in the described manner. Similarly, the lightograph process may be implemented, for example to a model, such as a 3D model of a subject, either as a physical representation of the 3D model and/or as a software rendering of the lightograph process using a digitized 3D model. Still further applications of the apparatuses, systems, and methods described herein may extend to Async art, whereby any layered art may be turned into Async art meaning that a piece of art may evolve over time and may be synced to anything, such as the stock market, weather patterns, different times of day, etc. A lightograph may be synced to any element and may be configured to evolve over time.

To facilitate the understanding of the embodiments described herein, a number of terms are defined below and further herein. The terms defined herein may have meanings as commonly understood by a person of ordinary skill in the areas relevant to the present disclosure. Terms such as "a," "an," and "the" are not intended to refer to only a singular entity, but rather include the general class of which a specific example may be used for illustration.

Lightograph or Lighto: A photograph containing evolving light, for example created in a manner as disclosed herein.

Lighteo: A video with the only movement being the light, for example created in a manner as disclosed herein.

Lightrait: A portrait containing evolving light, for example created in a manner as disclosed herein.

Lightscape: A landscape containing evolving light, for example created in a manner as disclosed herein.

Lightographer: Photographer, for example utilizing a system or apparatus as disclosed herein.

Lightography: Photography, for example utilizing a system or apparatus as disclosed herein.

Other examples of similar or otherwise analogous terms may include:

Lightographic: Photographic.

Lightomation: Animation.

Lightogif: Gif.

Lightogenic: Photogenic.

Lightographable: Photographable.

Further illustration may be provided by reference to Appendix A from U.S. Provisional Patent Application No. 63/210,297, incorporated by reference herewith, and which provides examples of four lightos, or images captured via a capture apparatus 130 and which may be processed in accordance with the description provided herein to create a lightograph. Two or more of the images in Appendix A may be combined to form a lightograph, for example as an animated image file such as a .gif, a .mov file, a .mp4 file, or other type of file capable of transitioning between the two or more images used to form the lightograph.

Still further illustration may be provided by reference to Appendix A from U.S. Provisional Patent Application No. 63/210,297, incorporated by reference herewith, and which provides a plurality of examples of lightollages according to aspects of the present disclosure. Each lightollage may include a plurality of sections of two or more of a plurality of images captured by the capture apparatus 130 which may be manually and/or automatically formed using a plurality of images captured by the capture apparatus 130. Appendices B.4 and B.5 reflect slight variations on lightollages creatable using a same group of images captured by the capture apparatus 130. Differences exist, for example, at the subject's hat and at the subject's left arm, with different portions of the captured images selected and placed in the two versions.

The terminology herein is used to describe specific embodiments consistent with the present disclosure, but their usage does not delimit the present disclosure, except as set forth in the claims. The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item Band item C.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of new and useful apparatuses, systems, and methods, it is not intended that such references be construed as limitations upon the scope of this disclosure except as set forth in the following claims.

What is claimed is:

1. A computer-implemented method of creating a moving light image for visualizing light transition across a subject, the method comprising:

capturing a plurality of images in rapid succession and in a specified sequence, each of the plurality of images having a different respective lighting configuration via a plurality of lighting sources arranged with respect to the subject, wherein the subject is substantially static for a duration of the specified sequence;

automatically generating and storing an executable file associated with the captured plurality of images, wherein execution of the file causes retrieval and time-based reproduction of one or more of the plurality of images and corresponding lighting effects in a substantially static image reference frame.

2. The method of claim 1, wherein one or more of the captured plurality of images are selectively retrieved and displayed in accordance with one or more parameters associated with execution of the file.

3. The method of claim 1, wherein the respective lighting configuration for each of the plurality of images is predetermined according to a user selection via a user interface.

4. The method of claim 3, comprising enabling user selection via the user interface of an operating mode from among a plurality of selectable operating modes, wherein the respective lighting configuration for each of the plurality of images is predetermined according to the selected operating mode.

5. The method of claim 1, comprising verifying that a capture apparatus associated with a requested image capture is stabilized with a field of view including the subject.

6. The method of claim 1, wherein generating the executable file comprises stitching a subset of the captured plurality of images and associated lighting effects according to one or more user-selectable mood parameters.

7. The method of claim 6, comprising generating the executable file as an animated display with respect to a user-specified time lapse as one of the one or more user-selectable mood parameters.

8. The method of claim 1, comprising aligning the plurality of captured images into respective layers of a working file having a first file format, said alignment with respect to identifiable edges at each layer and for each respective image, enabling image adjustment in the first file format, and selectively exporting one or more of the plurality of captured images into an executable file having a second file format with a higher image resolution.

9. A system for creating a moving light image for visualizing light transition across a subject, the system comprising:

an image capture apparatus;

a plurality of light effect elements arranged at different locations around a subject; and a processor configured upon receiving a trigger command to direct the image capture apparatus to capture a plurality of images in rapid succession and in a specified sequence, each of the plurality of images having a different respective lighting configuration via selective implementation of at least one of the plurality of light effect elements, wherein the subject is substantially static for a duration of the specified sequence, wherein the processor is further configured to automatically generate and store an executable file associated with the captured plurality of images, wherein execution of the file causes retrieval and time-based reproduction of one or more of the plurality of images and corresponding lighting effects in a substantially static image reference frame.

10. The system of claim 9, wherein the processor and the image capture apparatus are commonly associated with an electronic device having a display unit, and the electronic device is functionally linked to a communications network.

11. The system of claim 9, wherein the processor is associated with an electronic device having a display unit, and the electronic device is functionally linked to at least the image capture apparatus via a communications network.

12. The system of claim 9, wherein one or more of the captured plurality of images are selectively retrieved and displayed in accordance with one or more parameters associated with execution of the file.

13. The system of claim 9, further comprising a user interface configured to enable user selection of the respective lighting configuration for each of the plurality of images.

14. The system of claim 13, wherein the user interface is configured to enable user selection of an operating mode from among a plurality of selectable operating modes, wherein the respective lighting configuration for each of the plurality of images is predetermined according to the selected operating mode.

15. The system of claim 9, wherein the processor is further configured to verify that a capture apparatus associated with a requested image capture is stabilized with a field of view including the subject.

16. The system of claim 9, wherein generating the executable file comprises stitching a subset of the captured plurality of images and associated lighting effects according to one or more user-selectable mood parameters.

17. The system of claim 16, wherein the processor is configured to generate the executable file as an animated display with respect to a user-specified time lapse as one of the one or more user-selectable mood parameters.

18. The system of claim 9, wherein the processor is configured to:
  align the plurality of captured images into respective layers of a working file having a first file format, said alignment with respect to identifiable edges at each layer and for each respective image;
  enable image adjustment in the first file format; and
  selectively export one or more of the plurality of captured images into an executable file having a second file format with a higher image resolution.

19. The system of claim 9, wherein the plurality of images are captured in a high-speed burst mode comprising at least twelve frames per second.

20. The system of claim 19, wherein the plurality of images are captured in a high-speed burst mode comprising at least fifty frames per second.

* * * * *